US011715028B2

United States Patent
Nam et al.

(10) Patent No.: US 11,715,028 B2
(45) Date of Patent: Aug. 1, 2023

(54) AMPLITUDE, FREQUENCY, AND PHASE MODULATED SIMULTANEOUS ENTANGLING GATES FOR TRAPPED-ION QUANTUM COMPUTERS

(71) Applicant: IONQ, INC., College Park, MD (US)

(72) Inventors: Yunseong Nam, North Bethesda, MD (US); Reinhold Blumel, Middletown, CT (US); Nikodem Grzesiak, College Park, MD (US)

(73) Assignee: IONQ, INC., College Park, MD (US)

( * ) Notice: Subject to any disclaimer, the term of this patent is extended or adjusted under 35 U.S.C. 154(b) by 0 days.

(21) Appl. No.: 17/746,544

(22) Filed: May 17, 2022

(65) Prior Publication Data
US 2022/0284335 A1    Sep. 8, 2022

Related U.S. Application Data

(63) Continuation of application No. 16/854,043, filed on Apr. 21, 2020, now Pat. No. 11,379,750.
(Continued)

(51) Int. Cl.
*G06N 10/00*    (2022.01)
*G21K 1/00*    (2006.01)
(Continued)

(52) U.S. Cl.
CPC .............. *G06N 10/00* (2019.01); *B82Y 10/00* (2013.01); *G21K 1/003* (2013.01);
(Continued)

(58) Field of Classification Search
CPC ........ G06N 10/00; B82Y 10/00; G21K 1/003; H01J 49/0072; H01S 3/09; H04B 10/70
(Continued)

(56) References Cited

U.S. PATENT DOCUMENTS 8,633,437 B2    1/2014   Dantus et al.
9,335,606 B2    5/2016   Hanson et al.
(Continued)

FOREIGN PATENT DOCUMENTS

JP    2021-508382 A    3/2021
JP    2021-527253 A    10/2021

OTHER PUBLICATIONS

P. W. Shor, Polynomial-time algorithms for prime factorization and discrete logarithms on a quantum computer. SIAM Rev. 41, 303-332 (1999).
(Continued)

*Primary Examiner* — Tu-Tu V Ho
(74) *Attorney, Agent, or Firm* — Patterson & Sheridan, LLP

(57) ABSTRACT

A method of performing a computation using a quantum computer includes generating a plurality of laser pulses used to be individually applied to each of a plurality of trapped ions that are aligned in a first direction, each of the trapped ions having two frequency-separated states defining a qubit, and applying the generated plurality of laser pulses to the plurality of trapped ions to perform simultaneous pair-wise entangling gate operations on the plurality of trapped ions. Generating the plurality of laser pulses includes adjusting an amplitude value and a detuning frequency value of each of the plurality of laser pulses based on values of pair-wise entanglement interaction in the plurality of trapped ions that is to be caused by the plurality of laser pulses.

20 Claims, 6 Drawing Sheets

Related U.S. Application Data

(60) Provisional application No. 62/851,394, filed on May 22, 2019, provisional application No. 62/851,280, filed on May 22, 2019.

(51) Int. Cl.
  H01S 3/09 (2006.01)
  B82Y 10/00 (2011.01)
  H01J 49/00 (2006.01)
  H04B 10/70 (2013.01)

(52) U.S. Cl.
  CPC ............ *H01J 49/0072* (2013.01); *H01S 3/09* (2013.01); *H04B 10/70* (2013.01)

(58) Field of Classification Search
  USPC ........................................................ 359/291
  See application file for complete search history.

(56) References Cited

U.S. PATENT DOCUMENTS

| | | | |
|---|---|---|---|
| 9,858,531 | B1 | 1/2018 | Monroe et al. |
| 10,650,319 | B2 * | 5/2020 | Medford ................ G06N 10/00 |
| 2006/0249670 | A1 | 11/2006 | Monroe et al. |
| 2009/0213444 | A1 | 8/2009 | Goto et al. |

OTHER PUBLICATIONS

L. K. Grover, Quantum mechanics helps in searching for a needle in a haystack. Phys. Rev. Lett. 79, 325-328 (1997).
R. P. Feynman, Simulating physics with computers. Int. J. Theor. Phys. 21, 467-488 (1982).
Y. Wang, M. Um, J. Zhang, S. An, M. Lyu, J.-N. Zhang, L.-M. Duan, D. Yum, K. Kim, Single-qubit quantum memory exceeding ten-minute coherence time. Nat. Photonics 11, 646-650 (2017).
T. P. Harty, D. T. C. Allcock, C. J. Ballance, L. Guidoni, H. A. Janacek, N. M. Linke, D. N. Stacey, D. M. Lucas, High-delity preparation, gates, memory, and readout of a trapped-ion quantum bit. Phys. Rev. Lett. 113, 220501 (2014).
J. P. Gaebler, T. R. Tan, Y. Lin, Y. Wan, R. Bowler, A. C. Keith, S. Glancy, K. Coakley, E. Knill, D. Leibfried, D. J. Wineland, High-delity universal gate set for 9Be+ion qubits. Phys. Rev. Lett. 117, 060505 (2016).
C. J. Ballance, T. P. Harty, N. M. Linke, M. A. Sepiol, D. M. Lucas, High-fidelity quantum logic gates using trapped-ion hyperfne qubits. Phys. Rev. Lett. 117,060504 (2016).
N. M. Linke, D. Maslov, M. Roetteler, S. Debnath, C. Figgatt, K. A. Landsman, K. Wright, C. Monroe, Experimental comparison of two quantum computing architectures. Proc. Natl. Acad. Sci. U.S.A. 114, 3305-3310 (2017).
D. Maslov, Y. S. Nam, J. Kim, An outlook for quantum computing, Proc. IEEE, 107, 5-10 (2019).
Y. Nam, D. Maslov, Low cost quantum circuits for classically intractable instances of the Hamiltonian dynamics simulation problem. https://arxiv.org/abs/1805.04645 (2018).
K. Wright et al., Benchmarking an 11-qubit quantum computer. https://arxiv.org/abs/1903.08181 (2019).
K. M Imer, A. S rensen, Multiparticle entanglement of hot trapped ions. Phys. Rev. Lett. 82, 1835-1838 (1999).
A. Sorensen, K. Molmer, Quantum computation with ions in thermal motion. Phys. Rev. Lett. 82, 1971-1974 (1999).
T. Choi, S. Debnath, T. A. Manning, C. Figgatt, Z.-X. Gong, L.-M. Duan, C. Monroe, Optimal quantum control of multimode couplings between trapped ion qubits for scalable entanglement. Phys. Rev. Lett. 112, 190502 (2014).
S.-L. Zhu, C. Monroe, L.-M. Duan, Arbitrary-speed quantum gates within large ion crystals through minimum control of laser beams. Europhys. Lett. 73,485-491 (2006).
S. Boyd, L. Vandenberghe, Convex Optimization (Cambridge Press, New York, NY, 2004).
C. Figgatt, A. Ostrander, N. M. Linke, K. A. Landsman, D. Zhu, D. Maslov, C. Monroe, Parallel entangling operations on a universal ion trap quantum computer. https://arxiv.org/abs/1810.11948 (2018).
Y. Lu, S. Zhang, K. Zhang, W. Chen, Y. Shen, J. Zhang, J.-N. Zhang, K. Kim, Scalable global entangling gates on arbitrary ion qubits. https://arxiv.org/abs/1901.03508 (2019).
S. Beauregard, Circuit for Shors algorithm using 2n + 3 qubits. Quant. Inf. Comp. 3, 175-185 (2003).
T. G. Draper, S. A. Kutin, E. M. Rains, K. M. Svore, A logarithmic-depth quantum carry-lookahead adder. Quant. Inf. Comp. 6, 351-369 (2006).
D. Maslov, Y. Nam, Use of global interactions in efficient quantum circuit constructions. New J. Phys. 20, 033018 (2018).
E. Bernstein, U. Vazirani, Quantum complexity theory, SIAM J. Comput. 26, 1411-1473 (1997).
Y. Nam et al., Ground-state energy estimation of the water molecule on a trapped ion quantum computer. https://arxiv.org/abs/1902.10171 (2019).
W. van Dam, S. Hallgren, L. Ip, Quantum algorithms for some hidden shift problems. SIAM J. Comput. 36, 763-778 (2006).
F. A. Calderon-Vargas, G. S. Barron, X.-H. Deng, A. J. Sigillito, E. Barnes, S. E. Economou, Fast high- fidelity entangling gates in Si double quantum dots. https://arxiv.org/abs/1902.02350 (2019).
L. S. Theis, F. Motzoi, F. K. Wilhelm, M. Saman, High-fidelity Rydberg-blockade entangling gate using shaped, analytic pulses. Phys. Rev. A 94, 032306 (2016).
M. M. Müller, H. R. Haakh, T. Calarco, C. P. Koch, C. Henkel, Prospects for fast Rydberg gates on an atom chip. Quant. Inf. Process 10, 771792 (2011).
J. M. Gambetta, F. Motzoi, S. T. Merkel, F. K. Wilhelm, Analytic control methods for high- delity unitary operations in a weakly nonlinear oscillator. Phys. Rev. A 83, 012308 (2011).
A. Sporl, T. Schulte-Herbruggen, S. J. Glaser, V. Bergholm, M. J. Storcz, J. Ferber, F. K. Wilhelm, Optimal control of coupled Josephson qubits. Phys. Rev. A75, 012302 (2007).
G. M. Amdahl, Validity of the single processor approach to achieving large scale computing capabilities. AFIPS Conf. Proc. 30, 483-485 (1967).
S. Debnath, N. M. Linke, C. Figgatt, K. A. Landsman, K. Wright, C. Monroe, Demonstration of a small programmable quantum computer with atomic qubits. Na-ture 536, 63{66 (2016).
P. H. Leung, K. A. Landsman, C. Figgatt, N. M. Linke, C. Monroe, K. R. Brown, Robust 2-qubit gates in a linear ion crystal using a frequency-modulated driving force, Phys. Rev. Lett. 120, 020501 (2018).
V. V. Shende, I. L. Markov, S. S. Bullock, Minimal universal two-qubit controlled-NOT-based circuits. Phys. Rev. A 69, 062321 (2004).
G.-D. Lin et al., "Large-scale quantum computation in an anharmonic linear ion trap," Europhysics Letters, vol. 86, No. 6 (Jul. 9, 2009), 60004 (5 pages).
Yukai Wu et al., "Noise Analysis for High-Fidelity Quantum Entangling Gates in an Anharmonic Linear Paul Trap", Physical Review A, vol. 97(Jun. 19, 2018), 062325 (16 pages).
T. Choi et al., "Optimal Quantum Control of Multimode Couplings between Trapped Ion Qubits for Scalable Entanglement," Physical Review Letters, vol. 112 (May 16, 2014), 190502 (5 pages).
Pak Hong Leung et al. "Entangling an Arbitrary Prior of Qubits in a Long Ion Crystal", arxiv.org, Cornell University Library, 201 Olin Library Cornell University Ithaca, NY 14853, Aug. 7, 2018, XP081096658, DOI: 10.1103/Physreva.8.032218.
International Search Report dated May 29, 2020 for Application PCT/US2020/015232.
Farhang Haddadfarshi et al. "High Fidelity Quantum Gates of Trapped Ions in the Presence of Motional Heating", New Journal of Physics, vol. 18, No. 12, Dec. 2, 2016, p. 123007, XP055722925.
International Search Report dated Sep. 4, 2020 for Application No. PCT/US2020/034008.
Search Report dated Aug. 27, 2020 for Application No. PCT/US2020/034010.
JP Office Action dated Jan. 30, 2023 for Application No. JP2021-568968. (with machine translation).

(56) References Cited

OTHER PUBLICATIONS

JP Office Action dated Jan. 30, 2023 for Application No. JP2021-568970. (with machine translation).

* cited by examiner

AMPLITUDE, FREQUENCY, AND PHASE MODULATED SIMULTANEOUS ENTANGLING GATES FOR TRAPPED-ION QUANTUM COMPUTERS

CROSS-REFERENCE TO RELATED APPLICATIONS

This application is a continuation of co-pending U.S. patent application Ser. No. 16/854,043, filed Apr. 21, 2020, which claims the benefit to U.S. Provisional Application No. 62/851,394, filed May 22, 2019, and the benefit to U.S. Provisional Application No. 62/851,280, filed May 22, 2019. Each of the aforementioned related patent applications are incorporated by reference herein.

BACKGROUND

Field

The present disclosure generally relates to a method of performing entangling gate operations in an ion trap quantum computer, and more specifically, to a method of constructing pulses to simultaneously perform multiple pair-wise entangling gate operations.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a chain of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser; or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a chain of trapped ions, which arise from their Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance. As the size of a quantum computer increases, implementation of two-qubit gate operations between a pair of ions increases complexity, and thus errors associated with the implementation and resources, such as laser powers, required for the implementation increase.

To increase the size of a quantum computer that may be able to implement algorithms to solve problems otherwise intractable in classical computer, there is a need for a procedure to accurately control qubits to perform a desired computation process with minimum resources.

SUMMARY

A method of performing a computation using a quantum computer includes generating a plurality of laser pulses used to be individually applied to each of a plurality of trapped ions that are aligned in a first direction, each of the trapped ions having two frequency-separated states defining a qubit, and applying the generated plurality of laser pulses to the plurality of trapped ions to perform simultaneous pair-wise entangling gate operations on the plurality of trapped ions. Generating the plurality of laser pulses includes adjusting an amplitude value and a detuning frequency value of each of the plurality of laser pulses based on values of pair-wise entanglement interaction in the plurality of trapped ions that is to be caused by the plurality of laser pulses.

A non-transitory computer-readable medium including computer program instructions, which when executed by a processor, cause the processor to generate a plurality of laser pulses used to be individually applied to each of a plurality of trapped ions that are aligned in a first direction, each of the trapped ions having two frequency-separated states defining a qubit, and apply the generated plurality of laser pulses to the plurality of trapped ions to perform simultaneous pair-wise entangling gate operations on the plurality of trapped ions. Generating the plurality of laser pulses includes adjusting an amplitude value and a detuning frequency value of each of the plurality of laser pulses based on values of pair-wise entanglement interaction in the plurality of trapped ions that is to be caused by the plurality of laser pulses.

A quantum computing system includes a plurality of trapped ions that are aligned in a first direction, each of the trapped ions having two hyperfine states defining a qubit; and a controller comprising non-volatile memory having a number of instructions stored therein which, when executed by a processor, causes the quantum computing system to perform operations including generating a plurality of laser pulses used to be individually applied to each of the plurality of trapped ions, and applying the generated plurality of laser pulses to the plurality of trapped ions to perform simultaneous pair-wise entangling gate operations on the plurality of trapped ions. Generating the plurality of laser pulses includes adjusting an amplitude value and a detuning frequency value of each of the plurality of laser pulses based on values of pair-wise entanglement interaction in the plurality of trapped ions that is to be caused by the plurality of laser pulses.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
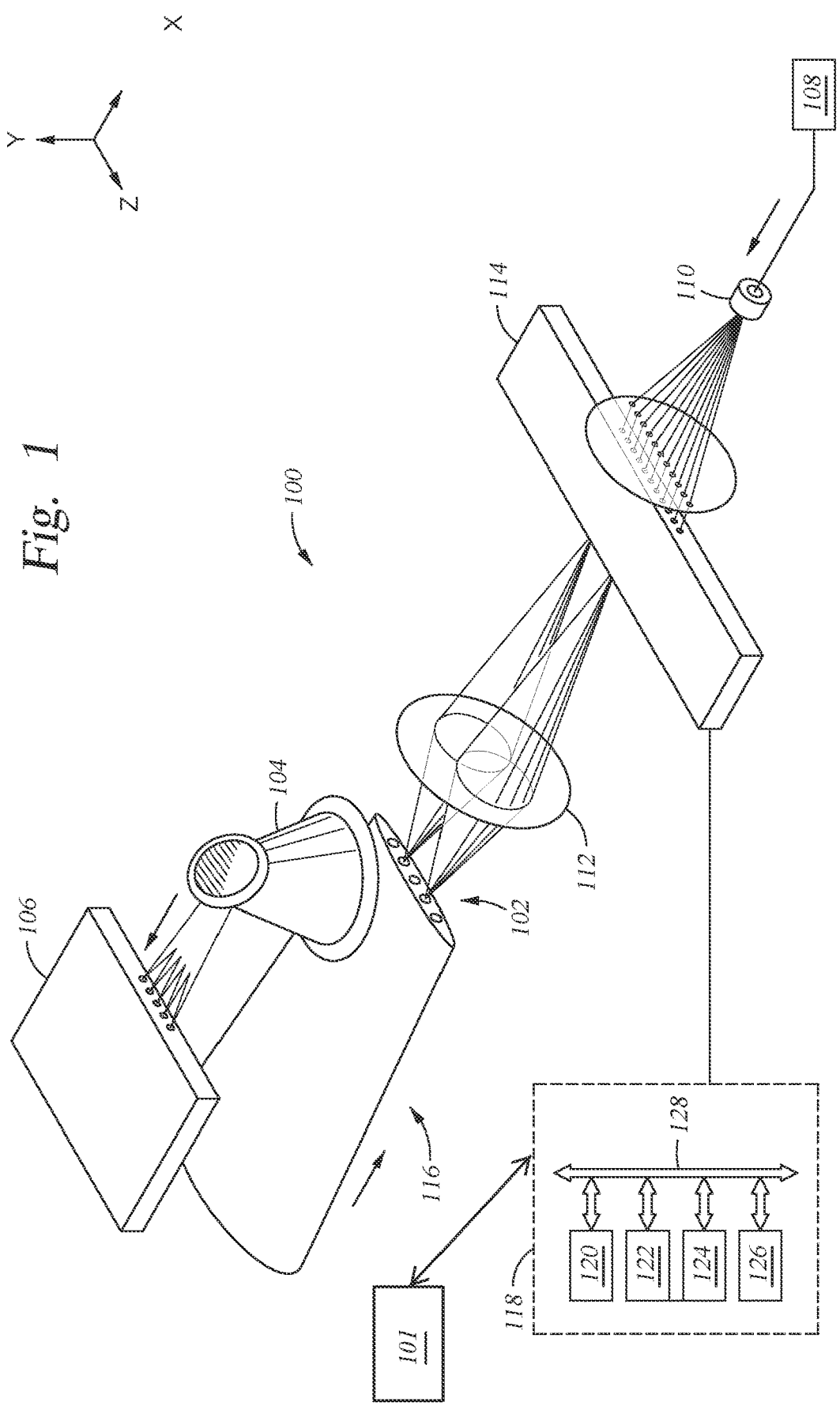
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for designing, optimizing, and delivering pulses to simultaneously perform pair-wise entangling gate operations on multiple pairs of ions during a quantum computation, and, more specifically, to pulses that can be constructed in an efficient manner and further can reduce the required laser power to perform the entangling gate operations.

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal logic gates, translating the series of universal logic gates into laser pulses to apply on the quantum register, and pre-calculating parameters that optimize the laser pulses by use of a central processing unit (CPU). A software program for performing the task of decomposing and executing the quantum algorithms is stored in a non-volatile memory within the classical computer. The quantum register includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer the pre-calculated parameters for power-optimal pulses at the beginning of running the selected algorithm on the quantum register, controls various hardware associated with controlling any and all aspects used to run the selected algorithm on the quantum register, and returns a read-out of the quantum register and thus output of results of the quantum computation(s) at the end of running the algorithm to the classical computer.

The methods and systems described herein include processes for translating a logic gate into laser pulses that are applied to a quantum register, and also processes for pre-calculating parameters that optimize the laser pulses that are applied to the quantum register and used to improve the performance of quantum computer.

Among several known sets of universal logic gates by which any quantum algorithm can be decomposed, a set of universal logic gates, commonly denoted as {R, XX}, is native to a quantum computing system of trapped ions described herein. Here, the R gate corresponds to manipulation of individual qubit states of trapped ions, and the XX gate (also referred to as an "entangling gate" or "pair-wise entangling gate") corresponds to manipulation of the entanglement of two trapped ions. For those of ordinary skill in the art, it should be clear the R gate can be implemented with near perfect fidelity, while the formation of the XX gate is complex and requires optimization for a given type of trapped ions, number of ions in a chain of trapped ions, and the hardware and environment in which the trapped ions are trapped, to name just a few factors, such that the fidelity of the XX gate is increased and computational errors within a quantum computer are avoided or decreased. In the following discussion, methods of generating and optimizing a pulse used to perform computations based the formation of an XX gate that has an improved fidelity will be described.

As the size of a quantum computer increases, the complexity of the entangling gate operations used to perform quantum computations increases, and the complexity of the pulses used to perform these entangling gate operations also increases. The required laser power to implement such complex pulses subsequently increases, and thus an available laser power may limit the size of a quantum computer that can be implemented. The method and system described in this disclosure simplify the construction of the pulses and further reduce the required laser power to implement the pulses such that a quantum computer can be scaled up to a larger size so that it can perform more complex computational operations. This implies a faster execution of entangling gates for a given power budget. Errors that scale with the delivered laser power would decrease with smaller laser power requirement.

General Hardware Configurations

FIG. 1 is a partial view of an ion trap quantum computer system, or system 100, according to one embodiment. The system 100 includes a classical (digital) computer 101, a system controller 118 and a quantum register that is a chain 102 of trapped ions (i.e., five shown) that extend along the Z-axis. The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates all ions at once. The system controller (also referred to as an "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The RF controller 118 executes a control program which is stored in the ROM 122 or the storage unit 126 and uses the RAM 124 as a working area. The control program will include software applications that include program code that may be executed by processor in order to perform various functionalities associated with receiving and analyzing data and controlling any and all aspects of the methods and hardware used to create the ion trap quantum computer system 100 discussed herein.

Figure 2:
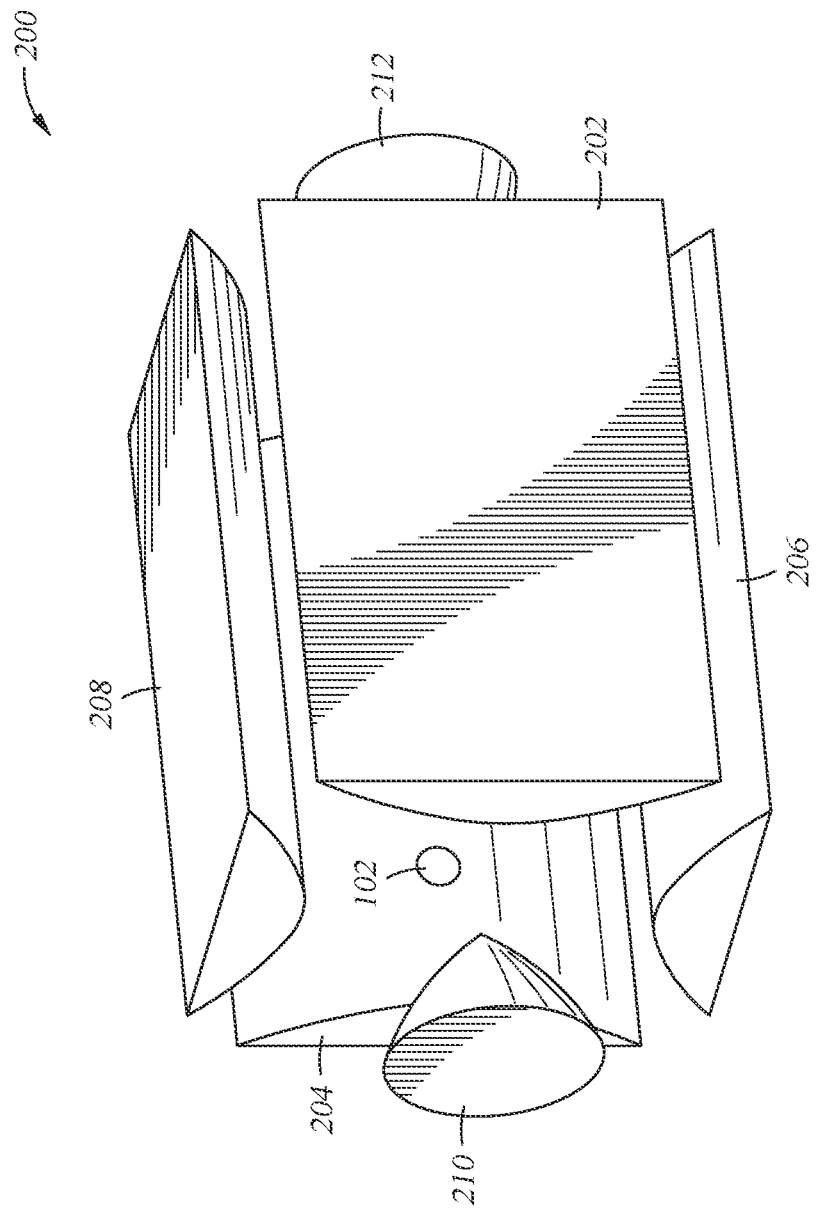
FIG. 2 depicts a schematic view of an ion trap for confining ions in a chain according to one embodiment.

FIG. 2 depicts a schematic view of an ion trap 200 (also referred to as a Paul trap) for confining ions in the chain 102 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the chain 102 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Trapped Ion Configuration and Quantum Bit Information

Figure 3A:
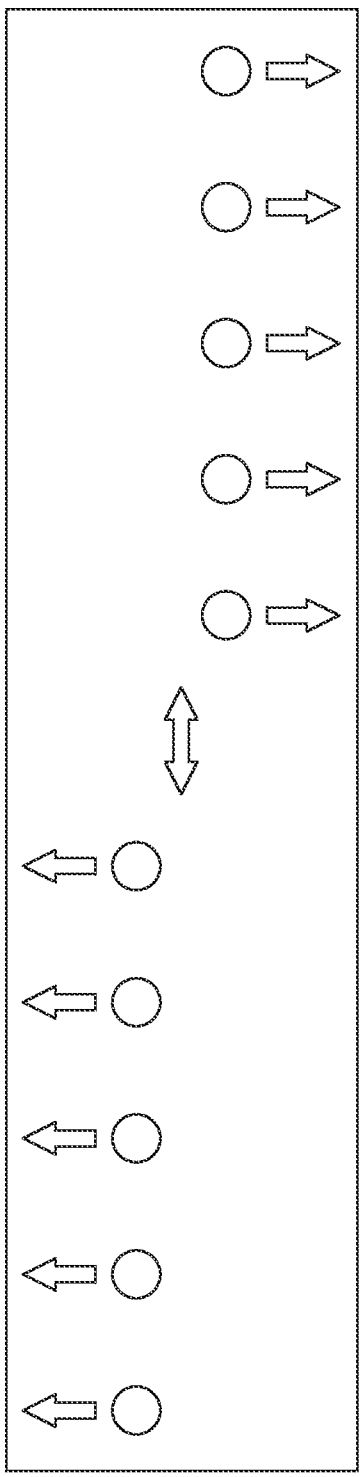
FIGS. 3A, 3B, and 3C depict a few schematic collective transverse motional mode structures of a chain of five trapped ions.
Figure 3B:
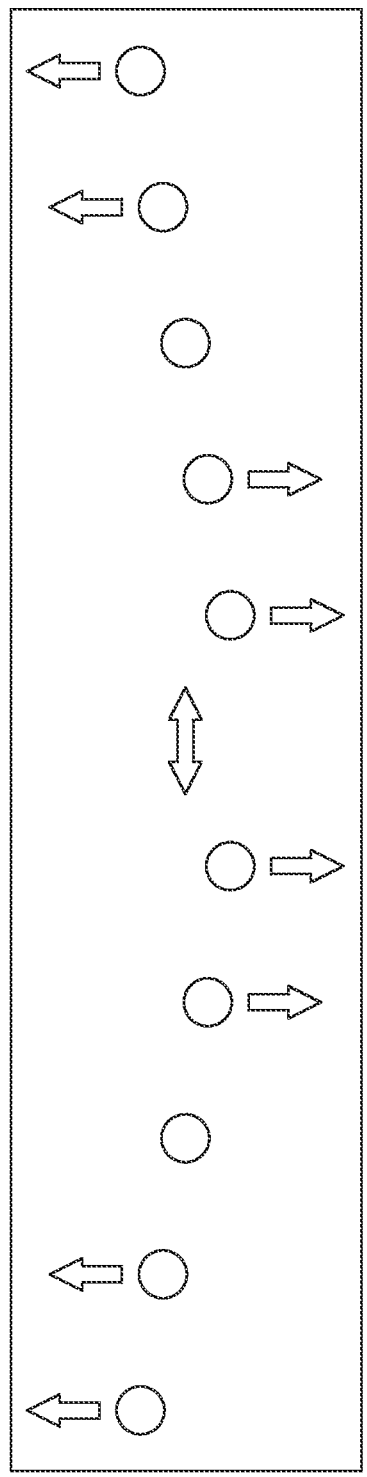
Figure 3C:
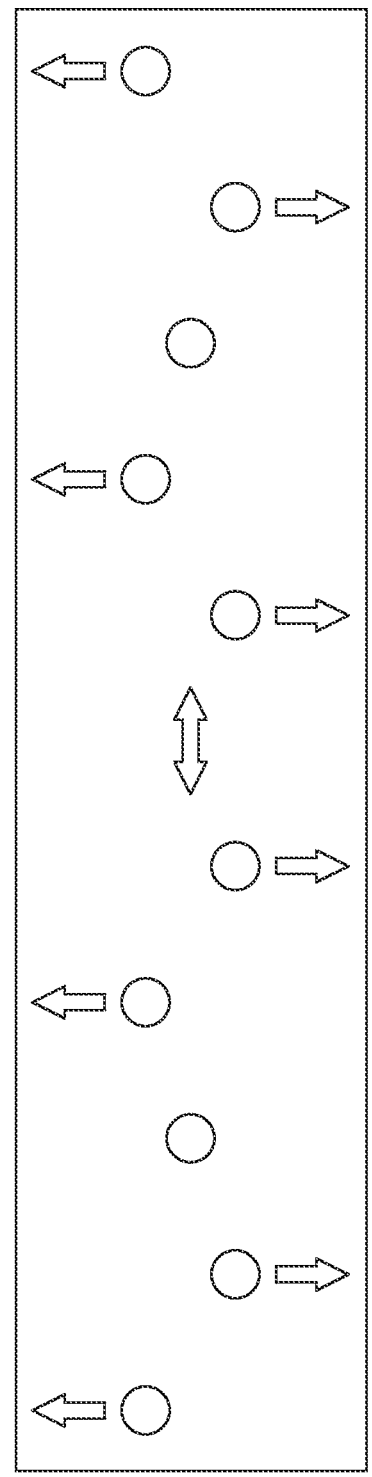

FIGS. 3A, 3B, and 3C depict a few schematic structures of collective transverse motional modes (also referred to simply as "motional mode structures") of a chain 102 of five trapped ions, for example. Here, the confining potential due to a static voltage $V_S$ applied to the end-cap electrodes 210 and 212 is weaker compared to the confining potential in the radial direction. The collective motional modes of the chain 102 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the p-th lowest energy is hereinafter referred to as $|n_{ph}\rangle_p$, where $n_{ph}$ denotes the number of motional quanta (in units of energy excitation, referred to as phonons) in the motional mode, and the number of motional modes P in a given transverse direction is equal to the number of trapped ions N in the chain 102. FIGS. 3A-3C schematically illustrates examples of different types of collective transverse motional modes that may be experienced by five trapped ions that are positioned in a chain 102. FIG. 3A is a schematic view of a common motional mode $|n_{ph}\rangle_p$ having the highest energy, where P is the number of motional modes. In the common motional mode $|n\rangle_p$, all ions oscillate in phase in the transverse direction. FIG. 3B is a schematic view of a tilt motional mode $|n_{ph}\rangle_{P-1}$ which has the second highest energy. In the tilt motional mode, ions on opposite ends move out of phase in the transverse direction (i.e., in opposite directions). FIG. 3C is a schematic view of a higher-order motional mode $|n_{ph}\rangle_{P-3}$ which has a lower energy than that of the tilt motional mode $|n_{ph}\rangle_{P-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 4:
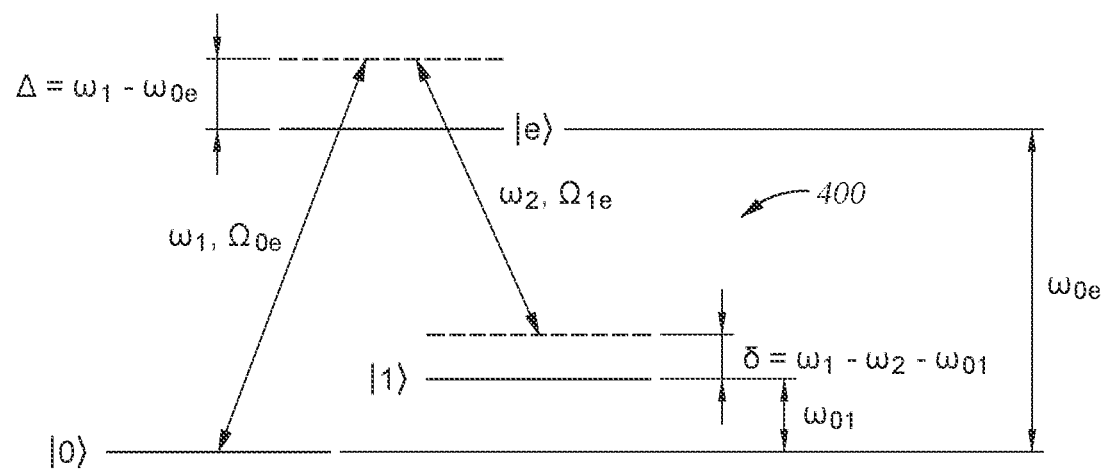
FIG. 4 depicts a schematic energy diagram of each ion in a chain of trapped ions according to one embodiment.

FIG. 4 depicts a schematic energy diagram 400 of each ion in the chain 102 of trapped ions according to one embodiment. In one example, each ion may be a positive Ytterbium ion, $^{171}Yb^+$ which has the $^2S_{1/2}$ hyperfine states (i.e., two electronic states) with an energy split corresponding to a frequency difference (referred to as a "carrier frequency") of $\omega_{01}/2\pi=12.642812$ GHz. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_p$ for any motional mode p with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript p denotes the motional ground state for a motional mode p of a chain 102 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 4, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 4. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions (Be$^+$, Ca$^+$, Sr$^+$, Mg+, and Ba$^+$) or transition metal ions (Zn$^+$, Hg$^+$, Cd$^+$).

Figure 5:
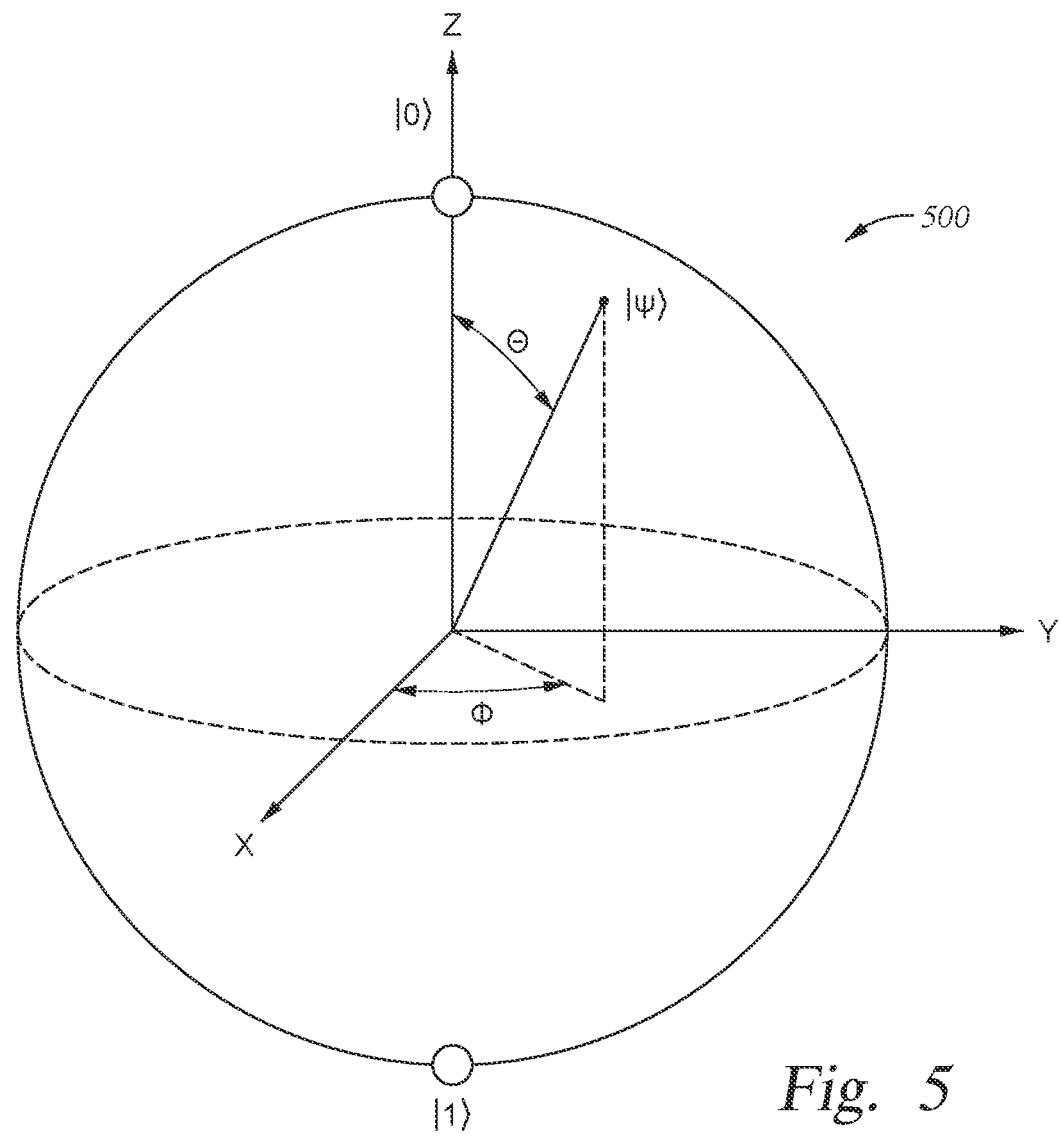
FIG. 5 depicts a qubit state of an ion represented as a point on a surface of the Bloch sphere.

FIG. 5 is provided to help visualize a qubit state of an ion is represented as a point on a surface of the Bloch sphere 500 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "$\pi$-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter without loss of generality) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "$\pi/2$-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Figure 6A:
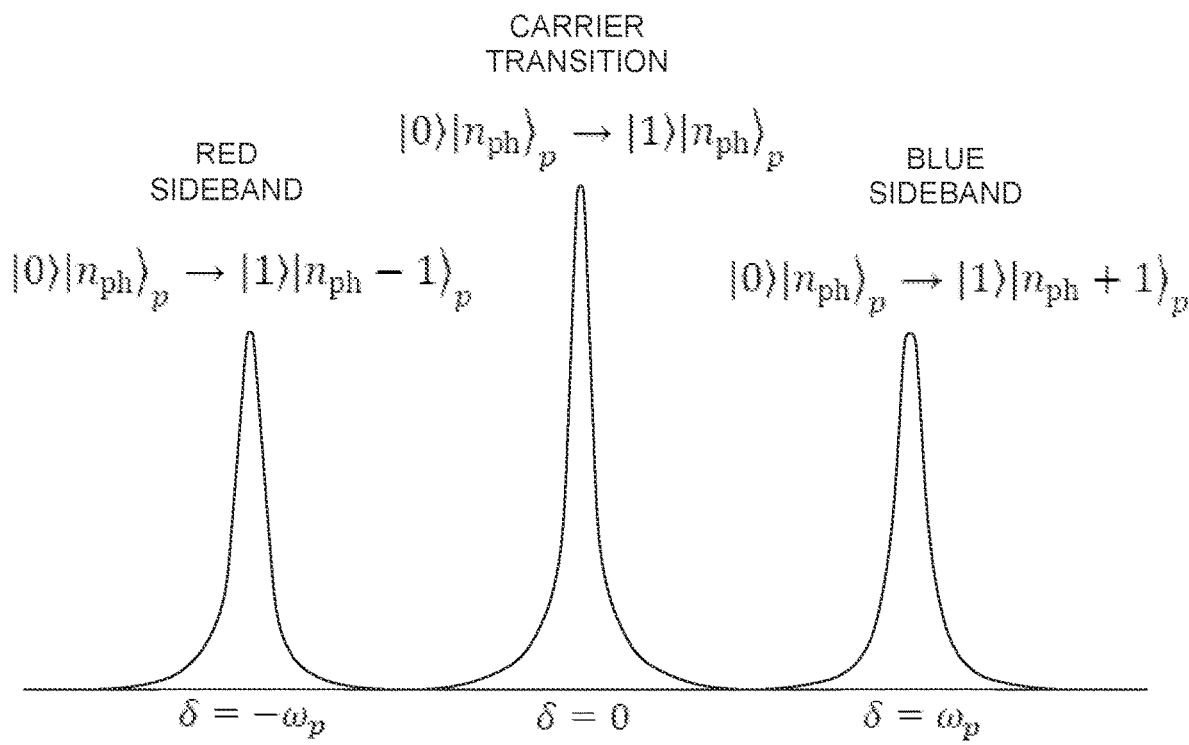
FIGS. 6A and 6B depict schematic views of motional sideband spectrum of each ion and a motional mode according to one embodiment.
Figure 6B:
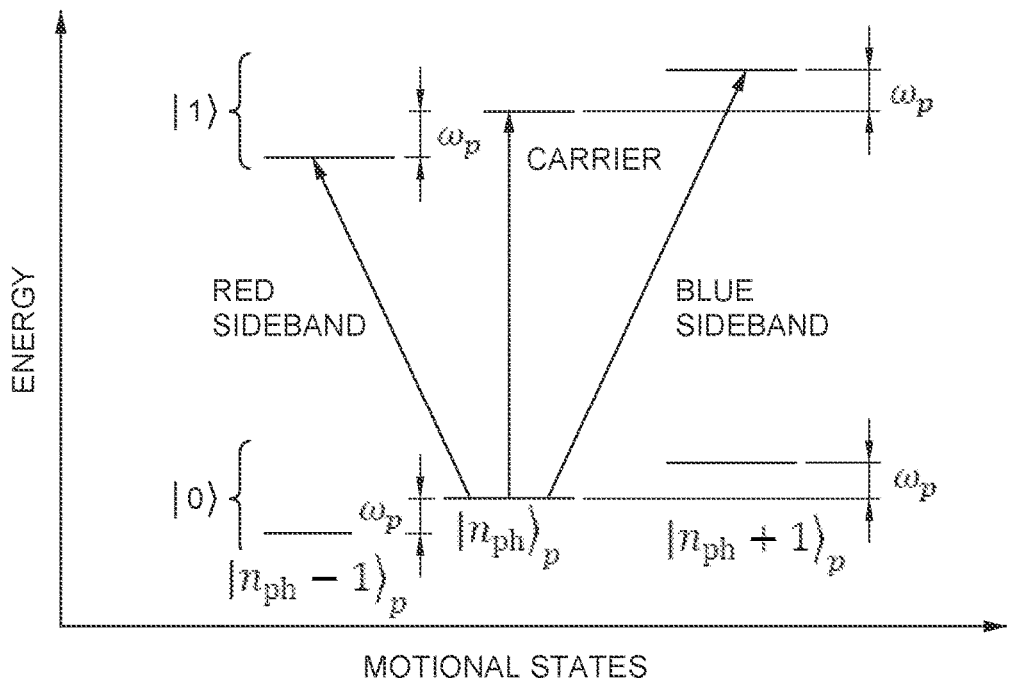

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the chain 102 in a motional mode $|n_{ph}\rangle_p$ having frequency $\omega_p$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_p$ and $|1\rangle|n_{ph}+1\rangle_p$ occurs (i.e., a transition from the p-th motional mode with n-phonon excitations denoted by $|n_{ph}\rangle_p$ to the p-th motional mode with $(n_{ph}+1)$-phonon excitations denoted by $|n_{ph}+1\rangle_p$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_p$ of the motional mode $|n_{ph}\rangle_p$, $\delta=\omega_1-\omega_2-\omega_{01}=-\mu<0$, referred to as a red sideband), Rabi flopping between combined qubit-motional states $|0\rangle|n_{ph}\rangle_p$ and $|1\rangle|n_{ph}-1\rangle_p$ occurs (i.e., a transition from the motional mode $|n_{ph}\rangle_p$ to the motional mode $|n_{ph}-1\rangle_p$ with one less phonon excitations occurs when the qubit state $|0\rangle$ flips to $|1\rangle$). A $\pi/2$-pulse on the blue sideband applied to a qubit transforms the combined qubit-motional state $|0\rangle|n_{ph}\rangle_p$ into a superposition of $|0\rangle|n_{ph}\rangle_p$ and $|1\rangle|n_{ph}+1\rangle_p$. A $\pi/2$-pulse on the red sideband applied to a qubit transforms the combined qubit-motional $|0\rangle|n_{ph}\rangle_p$ into a superposition of $|0\rangle|n_{ph}\rangle_p$ and $|1\rangle|n_{ph}-1\rangle_p$. When the two-photon Rabi frequency $\Omega(t)$ is smaller as compared to the detuning frequency $\delta=\omega_1-\omega_2-\omega_{01}=-\mu$, the blue sideband transition or the red sideband transition may be selectively driven. Thus, a qubit can be entangled with a desired motional mode by applying the right type of pulse, such as a $\pi/2$-pulse, which can be subsequently entangled with another qubit, leading to pair-wise entanglement interaction in the two qubits. Pairwise-entanglement interaction in qubits is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$$|0\rangle_i|0\rangle_j \rightarrow |0\rangle_i|0\rangle_j - i|1\rangle_i|1\rangle_j$$

$$|0\rangle_i|1\rangle_j \rightarrow |0\rangle_i|1\rangle_j - i|1\rangle_i|0\rangle_j$$

$$|1\rangle_i|0\rangle_j \rightarrow -i|0\rangle_i|1\rangle_j + |1\rangle_i|0\rangle_j$$

$$|1\rangle_i|1\rangle_j \rightarrow -i|0\rangle_i|0\rangle_j + |1\rangle_i|1\rangle_j$$

For example, when the two qubits (i-th and j-th qubits) are both initially in the hyperfine ground state $|0\rangle$ (denoted as $|0\rangle_i|0\rangle_j$) and subsequently a $\pi/2$-pulse on the blue sideband is applied to the i-th qubit, the combined state of the i-th qubit and the motional mode $|0\rangle_i|n_{ph}\rangle_p$ is transformed into a superposition of $|0\rangle_i|n_{ph}\rangle_p$ and $|1\rangle_i|n_{ph}+1\rangle_p$, and thus the combined state of the two qubits and the motional mode is transformed into a superposition of $|0\rangle_i|0\rangle_j|n_{ph}\rangle_p$ and $|1\rangle_i|0\rangle_j|n_{ph}+1\rangle_p$. When a $\pi/2$-pulse on the red sideband is applied to the j-th qubit, the combined state of the j-th qubit and the motional mode $|0\rangle_j|n_{ph}\rangle_p$ is transformed to a superposition of $|0\rangle_j|n_{ph}\rangle_p$ and $|1\rangle_j|n_{ph}-1\rangle_p$ and the combined state $|0\rangle_j|n_{ph}+1\rangle_p$ is transformed into a superposition of $|0\rangle_j|n_{ph}+1\rangle_p$ and $|1\rangle_j|n_{ph}\rangle_p$.

Thus, applications of a $\pi/2$-pulse on the blue sideband on the i-th qubit and a $\pi/2$-pulse on the red sideband on the j-th qubit may transform the combined state of the two qubits and the motional mode $|0\rangle_i|0\rangle_h|n_{ph}\rangle_p$ into a superposition of $|0\rangle_i|0\rangle_j|n_{ph}\rangle_p$ and $|1\rangle_i|1\rangle_j|n_{ph}\rangle_p$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_p$ and $|0\rangle_i|1\rangle_j|n_{ph}-1\rangle_p$) can be removed by a sufficiently complex pulse sequence, and thus the combined state of the two qubits and the motional mode after the XX-gate operation may be considered disentangled as the initial number of phonon excitations $n_{ph}$ in the p-th motional mode stays unchanged at the end of the XX-gate operation. Thus, qubit states before and after the XX-gate operation will be described below generally without including the motional modes.

More generally, the combined state of m-th and n-th qubits transformed by the application of pulses on the sidebands for duration $\tau$ (referred to as a "gate duration"), having amplitude $\Omega^{(m)}(t)$ and detuning frequency $\mu^{(m)}(t)$, and amplitude $\Omega^{(n)}(t)$ and detuning frequency $\mu^{(n)}(t)$, respectively, can be described in terms of a pair-wise entanglement interaction $\chi^{(m,n)}(\tau)$ as follows:

$$|0\rangle_m|0\rangle_n \rightarrow \cos(\chi^{(m,n)}(\tau)/2)|0\rangle_m|0\rangle_n - i\sin(\chi^{(m,n)}(\tau)/2)|1\rangle_m|1\rangle_n$$

$$|0\rangle_m|1\rangle_n \rightarrow \cos(\chi^{(m,n)}(\tau)/2)|0\rangle_m|1\rangle_n - i\sin(\chi^{(m,n)}(\tau)/2)|1\rangle_m|0\rangle_n$$

$$|1\rangle_m|0\rangle_n \rightarrow -i\sin(\chi^{(m,n)}(\tau)/2)|0\rangle_m|1\rangle_n + \cos(\chi^{(m,n)}(\tau)/2)|1\rangle_m|0\rangle_n$$

$$|1\rangle_m|1\rangle_n \rightarrow -i\sin(\chi^{(m,n)}(\tau)/2)|0\rangle_m|0\rangle_n + \cos(\chi^{(m,n)}(\tau)/2)|1\rangle_m|1\rangle_n$$

where, $$\chi^{(m,n)}(\tau) = 4\sum_{p=1}^{P} \eta_p^{(m)}\eta_p^{(n)}$$

$$\int_0^\tau dt_2 \int_0^{t_2} dt_1 \Omega^{(m)}(t_2)\Omega^{(n)}(t_1)\sin(\psi^{(m)}(t_2))\sin(\psi^{(n)}(t_1))\sin[\omega_p(t_2-t_1)]$$

and $\eta_p^{(m)}$ is the Lamb-Dicke parameter that quantifies the coupling strength between the m-th ion and the p-th motional mode having the frequency $\omega_p$, $\psi^{(m)}(t)$ is an accumulated phase $\psi^{(m)}(t)=\psi_0^{(m)}+\int_0^t \mu^{(m)}(t')dt'$ of the pulse, $\psi_0^{(m)}$ is an initial phase which may be assumed to be zero (0) hereinafter for simplicity without loss of generality, and P is the number of the motional modes (equal to the number N of ions in the chain 102).

Constructing Pulses for Simultaneous Entangling Gate Operations

The pair-wise entanglement interaction in two qubits described above can be used to perform an XX-gate operation (also referred to as a "pair-wise entangling gate operation"). The XX-gate operation (XX gate) along with single-qubit operation (R gate) forms a set of universal gates {R, XX} that can be used to build a quantum computer that is configured to perform desired computational processes. To perform an XX-gate operation between m-th and n-th qubits, pulses that satisfy the condition $\chi^{(m,n)}(\tau)=\theta^{(m,n)}(0<\theta^{(m,n)}\leq\pi/2)$ (i.e., the pair-wise entanglement interaction $\chi^{(m,n)}(\tau)$ has a desired value $\theta^{(m,n)}$, referred to as condition for a non-zero pair-wise entanglement interaction) are constructed and applied to the m-th and the n-th qubits. The transformations of the combined state of the m-th and the n-th qubits described above corresponds to the XX-gate operation with maximal entanglement when $\theta^{(m,n)}=\pi/2$. The amplitudes and the detuning frequencies, $(\omega^{(m)}(t),\mu^{(m)}(t))$ and $(\omega^{(n)}(t),\mu^{(n)}(t))$, of the pulses to be applied to the m-th and the n-th qubits are control parameters that can be adjusted to ensure a non-zero tunable entanglement of the m-th and the n-th qubits to perform a desired XX gate operation on m-th and n-th qubits.

To perform pair-wise entangling gate operations simultaneously on two pairs of ions, for example, a pair of m-th and n-th ions (referred to simply as (m,n)) and a pair of m'-th and n'-th ions (referred to simply as (m',n')), pulses having amplitudes and detuning frequencies $(\omega^{(m)}(t),\mu^{(m)}(t))$, $(\omega^{(n)}(t),\mu^{(n)}(t))$, $(\omega^{(m')}(t),\mu^{(m')}(t))$, and $(\omega^{(n')}(t),\mu^{(n')}(t))$ are individually applied to the m-th, n-th, m'-th, and n'-th ions, respectively. The amplitudes and the detuning frequencies $(\omega^{(m)}(t),\mu^{(m)}(t))$, $(\omega^{(n)}(t),\mu^{(n)}(t))$, $(\omega^{(m')}(t),\mu^{(m')}(t))$, and $(\omega^{(n')}(t),\mu^{(n')}(t))$ of the pulses are determined such that the pairs of ions that are to be entangled (i.e., (m,n), (m',n')) are coupled to each other and pairs of ions that are not to be entangled (i.e., (m,m'), (m,n'), (n,m'), (n,n')) are decoupled from each other at the end of application of the pulses. That is, for the pairs that are to be entangled, the condition for a non-zero pair-wise entanglement interaction $\chi^{(l,l')}(\tau)=\theta^{(l,l')}$ ((l,l')=(m,n),(m',n')) must be satisfied, and for pairs of ions that are not to be entangled, the condition $\chi^{(l,l')}(\tau)=0$ (l,l')≠(m,n),(m',n')) (i.e., overall pair-wise entanglement interaction in each decoupled pair is zero) must be satisfied (referred to as a condition for decoupling).

The simultaneous pair-wise entangling gate operations can be performed on a larger number of pairs of ions. All ions in these pairs (i.e. ions that are each to be entangled with another ion) are referred to as "participating ions" or "participating qubits" in the simultaneous pair-wise entangling gate operations. The number of the participating ions in the simultaneous pair-wise entangling gate operations is denoted as $N_{EASE}$ hereinafter. To perform simultaneous pair-wise entangling gate operations on the $N_{EASE}$ participating ions, pulses each having amplitude $\Omega^{(m)}(t)$ and detuning frequency $\mu^{(m)}(t)$ (m=1, 2, ..., $N_{EASE}$) are individually applied to m-th ions. The amplitudes and detuning frequencies $(\Omega^{(m)}(t),\mu^{(m)}(t))$ of the pulses (m=1, 2, ..., $N_{EASE}$) are determined such that the condition for non-zero pair-wise entanglement interaction $\chi^{(l,l')}(\tau)=\theta^{(l,l')}$ (0<$\theta^{(l,l')}$≤π/2) is satisfied for the pairs of ions (l,l') that are to be entangled and the condition for decoupling $\chi^{(l,l')(\tau)}=0$ is satisfied for the pairs of ions (l,l') that are not to be entangled.

The control parameters, the amplitudes and detuning frequencies $(\Omega^{(m)}(t),\mu^{(m)}(t))$ of the pulses, must also satisfy conditions that all of the N trapped ions in the chain 102 that are displaced from their initial positions as the motional modes are excited by the delivery of the pulse return to the initial positions. The m-th qubit in a superposition state $|0\rangle+|1\rangle$ is displaced due to the excitation of the p-th motional mode during the gate duration τ and follows the trajectories $\pm\alpha_p^{(m)}(t')$ in phase space (position and momentum) of the p-th motional mode. The trajectories $\alpha_p^{(m)}(t')=-\eta_p^{(m)}\int_0^{t'} g^{(m)}(t)e^{i\omega_p t}dt$ are determined by the amplitude $\Omega^{(m)}(t)$ and the accumulated phase $\psi^{(m)}(t)=\psi_0^{(m)}+\int_0^{t'}\mu^{(m)}(t')dt'$ of the pulse, where $g^{(m)}(t)$ is a pulse function defined as $g^{(m)}(t)=\Omega^{(m)}(t)\cos(\psi^{(m)}(t))$. Thus, for the chain 102 of N trapped ions, the condition $\alpha_p^{(m)}(\tau)=0$ (i.e., the trajectories $\alpha_p^{(m)}(\tau)$ must be closed, referred to as a condition for returning of trapped ions to their original positions and momentum values (or closure of phase space trajectories) must be imposed for all the P motional modes (p=1, 2, ..., P) in addition to the condition for non-zero pair-wise entanglement interaction, $\chi^{(m,n)}(\tau)=\theta^{(m,n)}$ (0<$\theta^{(m,n)}$≤π/2).

The control parameters, the amplitudes and detuning frequencies $(\Omega^{(m)}(t),\mu^{(m)}(t))$ of the pulses (m=1, 2, ..., $N_{EASE}$), are also adjusted such that the resulting pulse is power-optimal, in which the required laser power is minimized (referred to as condition for minimized power). Since the required laser power is inversely proportional to the gate duration τ, a power-optimal pulse implements an XX gate operation with minimum power requirement if gate duration τ is fixed, or with shortest gate duration τ if a laser power budget is fixed.

In some embodiments, the amplitudes and the detuning frequencies $(\Omega^{(m)}(t),\mu^{(m)}(t))$ are chosen to be symmetric or anti-symmetric in time with respect to a middle point of the gate duration, t=τ/2 i.e., $$\Omega^{(m)(\pm)}\left(\frac{\tau}{2}-t\right) = \pm\Omega^{(m)(\pm)}\left(\frac{\tau}{2}+t\right),$$

$$\mu^{(m)(\pm)}\left(\frac{\tau}{2}-t\right) = \pm\mu^{(m)(\pm)}\left(\frac{\tau}{2}+t\right).$$

In the example described below, the amplitudes and the detuning frequencies $(\Omega^{(m)}(t),\mu^{(m)}(t))$ are chosen to be symmetric $(\Omega^{(m)(+)}(t)$ and $\mu^{(m)(+)}(t))$ for simplicity and may be referred to as $\Omega^{(m)}(t)$ and $\mu^{(m)}(t)$ without the subscript (+). With the symmetric detuning frequency $\mu^{(m)}(t)$, the accumulated phase $\psi^{(m)}(t)$ is anti-symmetric, i.e., $$\psi^{(m)}\left(\frac{\tau}{2}-t\right) = -\psi^{(m)}\left(\frac{\tau}{2}-t\right).$$

The condition for returning of trapped ions to their original positions and momentum values can be rewritten in terms of the anti-symmetric component $g^{(m)(-)}(t)$ of the pulse function $g^{(m)}(t)$ (simply referred to as "pulse function" and denoted by $g^{(m)}(t)$ without the script (−) hereinafter), as $$\alpha_{l,p}(\tau) = \eta_p^{(m)}\int_0^\tau g^{(m)}(t)\sin\left[\omega_p\left(\frac{\tau}{2}-t\right)\right]dt = 0.$$

The pulse functions $g^{(m)}(t)$ that are determined by the amplitudes and the detuning frequencies $(\Omega^{(m)}(t),\mu^{(m)}(t))$ of the pulse (m=1, 2, ..., $N_{EASE}$) are derived such that these conditions are satisfied, by varying the amplitudes and the detuning frequencies $(\Omega^{(m)}(t),\mu^{(m)}(t))$ of the pulse, thus varying the pulse functions $g^{(m)}(t)$. Here, for example, the pulse function $g^{(m)}(t)$ is expanded in Fourier-sine basis $$g^{(m)}(t) = \sum_{k=1}^{N_A} g_k^{(m)}\sin\left(2\pi k\frac{t}{\tau}\right)$$

over the gate duration τ, using basis functions sin $$\left(2\pi k\frac{t}{\tau}\right)$$

and pulse function coefficients $g_k^{(m)}$, where $N_A$ is the number of the basis functions. The condition for returning of trapped ions to their original positions and momentum values can be rewritten as $$\alpha_p^{(m)}(\tau) = 0 \mapsto \sum_{k=1}^{N_A} M_{pk} g_k^{(m)} = 0 (p=1, 2, ..., P)$$

where $M_{pk}$ is defined as $$M_{pk} = \int_0^\tau \sin\left(2\pi k\frac{t}{\tau}\right)\sin\left[\omega_p\left(\frac{\tau}{2}-t\right)\right]dt (p=1, 2, ..., P, k=1, 2, ..., N_A).$$

Equivalently, the condition for returning of trapped ions to their original positions and momentum values (e.g., closure of phase space trajectories) can be written as M$\vec{g}^{(m)}$=0 in a matrix form, where M is a P×$N_A$ coefficient matrix of $M_{pk}$ and $\vec{g}^{(m)}$ is a $N_A$ pulse function coefficient vector of $g_k^{(m)}$. The number of the basis functions $N_A$ is chosen to be larger than the number of motional modes P. Thus, there are $N_O(=N_A-P)$ non-trivial pulse function vectors of $\vec{g}^{(m)[\alpha]}$ ($\alpha=1, 2, \ldots, N_O$) that satisfy the condition for returning of trapped ions to their original positions and momentum values.

The conditions for non-zero pair-wise entanglement interaction and decoupling can be rewritten $$\chi^{(m,n)}(\tau) = \begin{cases} \theta^{(m,n)} & \text{if } m \text{ and } n \text{ are to be entangled} \\ 0 & \text{otherwise} \end{cases}$$

$$\mapsto \sum_{k=1}^{N_A} \sum_{l=1}^{N_A} g_k^{(m)} D_{kl}^{(m,n)} g_l^{(n)} = \begin{cases} \theta^{(m,n)} & \text{if } m \text{ and } n \text{ are to be entangled} \\ 0 & \text{otherwise} \end{cases}$$

where $D_{kl}^{(m,n)}$ is defined as $$D_{kl}^{(m,n)} = 4\sum_{p=1}^{P} \eta_p^{(m)} \eta_p^{(n)} \int_0^\tau dt_2 \int_0^{t_2} dt_1 \sin\left(2\pi k \frac{t_2}{\tau}\right) \sin\left(2\pi l \frac{t_1}{\tau}\right) \sin[\omega_p(t_1-t_2)],$$

or equivalently, $(\vec{g}^{(m)})^T D^{(m,n)} \vec{g}^{(n)} = \theta^{(m,n)}$ (if m and n are to be entangled) or 0 (otherwise) in a matrix form, where $D^{(m,n)}$ is a $N_A \times N_A$ coefficient matrix of $D_{kl}^{(m,n)}$ and $(\vec{g}^{(m)})^T$ is a transposed vector of $\vec{g}^{(m)}$. It should be noted the condition for returning of trapped ions to their original positions and momentum values and the conditions for non-zero pair-wise entanglement interaction and decoupling can in principle be written in a form known as a quadratically constrained quadratic program (QCQP) with respect to the pulse function coefficients $g_k^{(m)}$. In general, QCQP is known to be a non-deterministic polynomial-time (NP) hard problem (that is at least as hard as any NP-problem). However, in the embodiments described herein, these conditions form a special case of QCQP and thus can be converted in a form that is not a NP hard problem, such that a set of $N_{EASE} \times N_A$ pulse function coefficients $g_k^{(m)}$ is determined with overhead that increase polynomially with respect to the number of the participating ions $N_{EASE}$. This method for determining a set of $N_{EASE} \times N_A$ pulse function coefficients $g_k^{(m)}$ is referred to as an efficient arbitrary simultaneous entangling (EASE) protocol and a gate operation performed by the pulses having the determined pulse function coefficients $g_k^{(m)}$ (m=1, 2, . . . , $N_{EASE}$) is referred to as EASE gate hereinafter.

The condition for minimized power corresponds to minimizing a power function, $$P(t) = \|g^{(m)}(t)\|^2 = 2/\tau \int_0^\tau [g^{(m)}(t)]^2 dt = \Sigma_{k=1}^{N_A} [g_k^{(m)}]^2$$

that is the absolute square value of the pulse function $g^{(m)}(t)$ averaged over the gate duration $\tau$. Accordingly, a power-optimal pulse can be constructed by computing a linear combination ($\Sigma_{\alpha=1}^{N_O} \Lambda_\alpha \vec{g}^{(m)[\alpha]}$) of the non-trivial pulse function vectors $\vec{g}^{(m)[\alpha]}$, in which the coefficients $\Lambda_\alpha$ are determined such that the condition for non-zero entanglement interaction and the condition for minimized power are satisfied.

Thus, the amplitudes and the detuning frequencies ($\Omega^{(m)}(t), \mu^{(m)}(t)$) of the pulses (m=1, 2, . . . , $N_{EASE}$) can be computed based on the pulse functions $g^{(m)}(t)$ having the pulse function coefficients $g_k^{(m)}$ (k=1, 2, . . . , $N_A$) or equivalently the pulse function coefficient vector $\vec{g}^{(m)}$, that satisfy the condition for non-zero pair-wise entanglement interaction and the condition for minimized power. It should be noted the condition for returning of trapped ions to their original positions and momentum values and the condition for non-zero pair-wise entanglement interaction are in linear algebraic forms in terms of the pulse function coefficient vector $\vec{g}^{(m)}$. Thus, the pulse function coefficients $g_k^{(m)}$ that satisfy these conditions, along with the condition for minimized power, can be computed by known linear algebraic computational methods without approximation or iterations.

The expansion of the pulse function $g^{(m)}(t)$ in terms of pulse function coefficients $g_k^{(m)}$ corresponds to construction of a pulse in a frequency domain (with a frequency $2\pi k/\tau$), and thus a pulse constructed by the pulse function $g^{(m)}(t)$ may be directly implemented by multi-tone lasers (i.e., laser beams having multiple tones, each tone having a distinct amplitude and a corresponding frequency). That is, $N_A$-tone laser beams each having a frequency $2\pi k/\tau$ and amplitude $g_k^{(m)}$ (k=1, 2, . . . , $N_A$), with the phases of the laser beams fixed, may directly perform an EASE gate operation. The pulse function may be expanded using any functions that form a complete set or an incomplete set over the gate duration. However, when the pulse function is expanded in an incomplete set, there is no guarantee that the pulse function $g^{(m)}(t)$ computed by the method described above is power-optimal.

It should be noted that the particular example embodiments described above are just some possible examples of a method of construction of pulse functions according to the present disclosure and do not limit the possible configuration, specifications, or the like of methods of construction of pulse functions. For example, the symmetry of the amplitudes and the detuning frequencies ($\Omega^{(m)}(t), \mu^{(m)}(t)$) may be selected to be anti-symmetric (having a negative parity), or have mixed symmetry (having a mixed parity), based on convenience related to configurations, specifications, or the like of the system 100. However, imposing a symmetry in the amplitudes and the detuning frequencies ($\Omega^{(m)}(t), \mu^{(m)}(t)$) may lead to eliminating errors that obey certain symmetries.

Demodulation of Pulses

To apply the power-optimal and error-resilient pulse on the m-th qubit, the amplitude and the detuning frequency ($\Omega^{(m)}(t), \mu^{(m)}(t)$) of the power-optimal pulse need to be demodulated (i.e., the amplitude and the detuning frequency ($\Omega^{(m)}(t), \mu^{(m)}(t)$) are extracted and the pulse function $g^{(m)}(t)$ is converted into a pulse having a series of time-dependent pulse segments of a single laser beam) from the determined pulse function $g^{(m)} = \Omega^{(m)}(t) \sin(\psi^{(m)}(t))$ (m=1, 2, . . . , $N_{EASE}$), where $\psi^{(m)}(t) = \int_0^t \mu^{(m)}(t') dt'$ is the phase accumulated due to the detuning frequency $\mu^{(m)}(t)$. If this demodulation process is performed with a fixed detuning frequency, i.e., $\mu^{(m)}(t) = \mu_0$, the resulting pulse is amplitude-modulated (AM) pulse, in which the amplitude $\mu^{(m)}(t)$ is modulated. If the demodulation process is performed with a fixed amplitude, i.e., $\Omega^{(m)}(t) = \Omega_0$, the resulting pulse is a phase-modulated (PM) pulse, in which the phase $\psi^{(m)}(t)$ is modulated. If the phase $\psi^{(m)}(t)$ is implemented by modulating detuning frequency $\mu^{(m)}(t)$, the resulting pulse is a frequency-modulated (FM) pulse. The demodulation process can be performed in any combined modulation of amplitude $\Omega^{(m)}(t)$, phase $\psi^{(m)}(t)$ (thereby the detuning frequency $\mu^{(m)}(t)$), and frequency to construct a power-optimal pulse by conventional demodulation methods known in the art of signal processing.

The first step of an exemplary demodulation process is to find zeros of the pulse function $g^{(m)}(t) = \Omega^{(m)}(t) \sin(\psi^{(m)}(t))$ at $t=\zeta_j$ (j=0, 1, ..., $N_z$−1) (i.e., $g(\zeta_j)$=0). Here, $N_z$ is a total number of zeros of the pulse function $g^{(m)}$ (t). The amplitude $\Omega^{(m)}(t)$ can be chosen such that the amplitude $\Omega^{(m)}(t)$ does not have zeros. Thus, the pulse function $g^{(m)}$ (t) is zero when $\sin(\psi^{(m)}(t))$ is zero (i.e., $\sin(\psi^{(m)}(\zeta_j))$=0). Due to the nature of the sine function, $\sin(\psi^{(m)}(\zeta_j))$=0 when $\psi^{(m)}(\zeta_j)$= $j\pi$(j=0, 1, ..., $N_z$−1), including the zeros at the beginning and the end of the gate duration $\tau$ of the pulse (i.e. $t=\zeta_0$=0 and $t=\zeta_{N_z-1}=\tau$).

The second step of the demodulation process is to compute the detuning frequency $\mu^{(m)}(t)$ based on the zeros of the pulse function $g^{(m)}$ (t). In some embodiments, the detuning frequency $\mu^{(m)}(t)$ is approximated as a constant value between adjacent zeros of the pulse function $g^{(m)}$ (t) (i.e., $\mu^{(m)}(t) \approx \mu_j$ for $\zeta_{j-1}<t<\zeta_j$, j=1, 2, ..., $N_z$−1). Since the phase $\psi^{(m)}(t)$ is accumulated due to the detuning frequency $\mu^{(m)}(t)$ as in $\psi^{(m)}(t)=\int_0^t \mu^{(m)}(t')dt'$, the difference between the phase at $t=\zeta_j$ and $t=\zeta_{j-1}$ is $\psi^{(m)}(\zeta_j)-\psi^{(m)}(\zeta_{j-1})=\int_{\zeta_{j-1}}^{\zeta_j}\mu^{(m)}(t')dt'=\mu_j(\zeta_j-\zeta_{j-1})=\pi$. Consequently, the detuning frequency $\mu_j$ between $t=\zeta_{j-1}$ and $t=\zeta_j$ is determined as $\mu_j=\pi/(\zeta_j-\zeta_{j-1})$. The third step of the demodulation process is compute the amplitude $\Omega^{(m)}(t)$. A time derivative of the pulse function $g^{(m)}(t)=\Omega^{(m)}(t)\sin(\psi^{(m)}(t))$ at $t=\zeta_j$ is $$(g^{(m)})'(\zeta_j)=(\Omega^{(m)})'(\zeta_j)\sin(\psi^{(m)}(\zeta_j))+\Omega^{(m)}(\zeta_j)\cos(\psi^{(m)}(\zeta_j))$$
$$(\psi^{(m)})'(\zeta_j)=(-1)^j\Omega^{(m)}(\zeta_j)\mu^{(m)}(\zeta_j),$$

where $\psi^{(m)}(\zeta_j)=j\pi$ and $\psi^{(m)}(t)=\int_0^t \mu^{(m)}(t')dt'$ are used. Thus, the amplitude $\Omega^{(m)}(t)$ at $t=\zeta_j$ is computed as $\Omega^{(m)}(\zeta_j)=(-1)^j(g^{(m)})'(\zeta_j)/\mu^{(m)}(\zeta_j)$ using the time derivative of the computed pulse function $g^{(m)}(t)=\Sigma_{k=1}^{N_A}g_k^{(m)}\sin(2\pi kt/\tau)$(i.e., $(g^{(m)})'(t)=\Sigma_{k=1}^{N_A}g_k^{(m)}(2\pi k/\tau)\cos(2\pi kt/\tau))$.

In some embodiments, a set of the computed detuning frequencies $\mu_j$ (j=1, 2, ..., $N_z$−1) is interpolated with splines (e.g., functions defined piecewise by one or more polynomials or other algebraic expressions) and the interpolated values of the detuning frequency $\mu^{(m)}(t)$ is used for $\mu^{(m)}(\zeta_j)$ for computing the amplitude $\Omega^{(m)}(\zeta_j)$. In some embodiments, $\mu^{(m)}(\zeta_j)$ is (i) $\mu_j$, (ii) $\mu_{j+1}$, or (iii) $(\mu_j+\mu_{j+1})/2$ is used as $\mu^{(m)}(\zeta_j)$ for computing the amplitude $\Omega^{(m)}(\zeta_j)$.

In some embodiments, a set of the computed amplitude $\Omega^{(m)}(\zeta_j)$ is also interpolated with splines to compute the time-dependent amplitude $\Omega^{(m)}(t)$.

If the demodulation process for a phase-modulated (PM) pulse, a set of the computed phase $\psi^{(m)}(\zeta_j)$ may be interpolated with splines to compute the time-dependent phase $\psi^{(m)}(t)$.

EASE Protocol and EASE Gate

Figure 7:
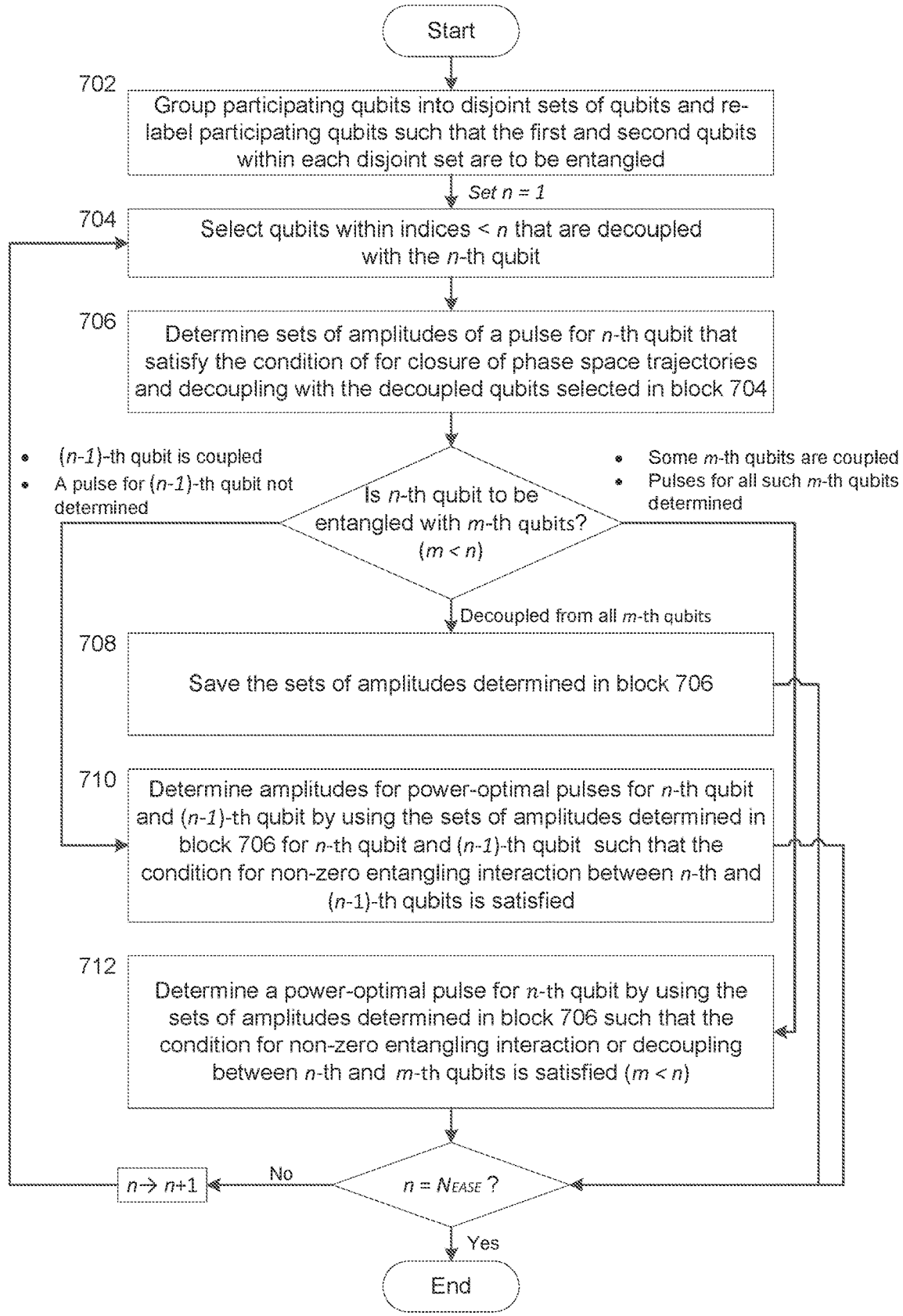
FIG. 7 depicts a flowchart illustrating a method to determine a set of control parameters (EASE protocol) according to one embodiment.

FIG. 7 depicts a flowchart illustrating a method 700 to determine a set of control parameters $g_k^{(m)}$ (EASE protocol) according to one embodiment. In this example, the chain 102 of N trapped ions is a quantum register, in which the two hyperfine states of each of the N trapped ions form a qubit.

In the example described herein, a desired quantum algorithm is selected by a classical computer (not shown) by use of a user interface, such as graphics processing unit (GPU) (not shown), and decomposed into R gate operations (single-qubit gate operations) and XX gate operations (also referred to as "entangling gate operations," "pair-wise entangling gate operation," or "two-qubit operations") on multiple pairs of qubits by the software program(s) within the classical computer. Among all the pair-wise entangling gate operations, pair-wise entangling gate operations on selected pairs of qubits ($N_{EASE}$ participating qubits in total) are determined to be performed simultaneously (an EASE gate) and pulses sequences to be applied to the $N_{EASE}$ participating qubits to cause pair-wise entanglement interaction in the selected pairs of qubits to perform the EASE gate operation are determined using the method 700 (the EASE protocol) as described below further by the software program(s) within the classical computer. The pulses determined by the software program(s) are applied to the $N_{EASE}$ participating qubits within the quantum register (the chain of N trapped ions) to perform the EASE gate operation on the selected pairs of qubits, controlled by a system controller.

At the beginning of the EASE protocol, each of the $N_{EASE}$ participating qubits is initially labeled with a number n (n=1, 2, ..., $N_{EASE}$), for example, in the order that the $N_{EASE}$ participating qubits are aligned in the chain 102 of N trapped ions. The $N_{EASE}$ participating qubits may be initially labeled in any other order. A qubit labeled with a number n may also be referred to as n-th qubit hereinafter.

In block 702 (pre-processing), the $N_{EASE}$ participating qubits are grouped into disjoint sets of qubits. The $N_{EASE}$ participating qubits are re-labeled such that qubits within each disjoint set are labeled with consecutive numbers and qubits that are labeled with the smallest and the second smallest numbers within each disjoint set (referred to as the first and second qubits in the disjoint set) correspond to one of the selected pairs on which pair-wise entangling gate operations are performed. For example, the chain 102 may have 11 trapped ions (i.e., qubits initially labeled with numbers 1 to 11) and entangling gates may be performed simultaneously on pairs of qubits (1, 2), (1, 4), (1, 5), (3, 6), and (3, 8). Then, the participating qubits are qubits labeled with 1-6 and 8. A first disjoint set may include qubits 1, 2, 4, and 5, and a second disjoint set may include qubits 3, 6, and 8. The qubits in the first disjoint set are re-labeled with 1-4 and the qubits in the second disjoint set are re-labeled with 5-7.

To construct a pulse having pulse functions $g^{(n)}(t)$ to be individually applied to n-th qubit (n=1, 2, ..., $N_{EASE}$), at first, the pulse function $g^{(1)}(t)$ of a first pulse to be applied to the first qubit (labeled with 1) and the pulse function $g^{(2)}(t)$ of a second pulse to be applied to the second qubit (labeled with 2) are determined. Based on the determined pulse functions $g^{(1)}(t)$ and $g^{(2)}(t)$ of the first and second pulses, the pulse function $g^{(3)}(t)$ of a third pulse to be applied to the third qubit (labeled with 3) is determined. This process is then continued until the pulse function $g^{(N_{EASE})}(t)$ of a $N_{EASE}$-th pulse to be applied to $N_{EASE}$-th qubit (labeled with $N_{EASE}$) is determined, and thus the pulse functions of the pulses to be applied to all the $N_{EASE}$ participating qubits are determined.

In block 704, as an initial step to determine the pulse function $g^{(n)}(t)$ of a n-th pulse to be applied to n-th qubit (n=1, 2, ..., $N_{EASE}$) qubits that are not to be entangled with the n-th qubit (referred to as "disentangled qubit" and labeled with s) among qubits labeled with m (m=1, 2, ..., n−1). That is, the n-th qubit and the s-th qubit (s≤n−1) do not correspond to any of the selected pairs on which pair-wise entangling gate operations are to be performed. The number of the disentangled qubits is denoted as $N_s$ hereinafter.

In block 706, among $N_0$ non-trivial pulse functions $g_k^{(n)}$ that satisfy the condition for returning of trapped ions to their original positions and momentum values ($M\vec{g}^{(n)}=0$), one or more pulse functions $g_k^{(n)}$ that satisfy the condition for decoupling ($\Sigma_{k=1}^{N_A}\Sigma_{l=1}^{k}g_k^{(s)}D_{kl}^{(s,n)}g_l^{(n)}=0$) between the n-th qubit and the s-th disentangled qubit are determined based on the pulse functions $g_k^{(s)}$ (k=1, 2, ..., $N_A$) of s-th pulse to be applied to s-th qubit. The pulse functions $g_k^{(s)}$ (k=1, 2, ..., $N_A$) will have been defined or determined in previous iterations. There are ($N_0$−(n−1)) pulse functions $g_k^{(n)}$ that satisfy the condition for returning of trapped ions to their original positions and momentum values and those pulse functions can be linearly combined to result in $g_k^{(n)}$.

Following the initial steps to determine the pulse functions $g^{(n)}(t)$ of the n-th pulse to be applied to n-th qubit (n=1, 2, . . . , $N_{EASE}$) in blocks 704 and 706, if all of the m-th qubits (m=1, 2, . . . , n−1) are decoupled from the n-th qubit, the process proceeds to block 708. If some of the m-th qubits (m=1, 2, . . . , n−1) (including (n−1)-th qubit) are coupled to the n-th qubit and a pulse to be applied to one of the m-th qubits (e.g., (n−1)-th qubit) has not yet determined, the process proceeds to block 710. This case occurs for the second qubit in every disjoint set. If some of the m-th qubits (m=1, 2, . . . , n−1) are coupled to the n-th qubit and pulses to be applied to all of the m-th qubits have been determined, the process proceeds to block 712.

In block 708, the pulse functions $\vec{g}^{[\beta]}$ ($\beta$=1, 2, . . . , $N_0$−(n−1)) for the n-th qubit are saved. In this case, all of the m-th qubits (m=1, 2, . . . , n−1) are decoupled from the n-th qubit. The process returns to block 704 for determining the pulse function $g^{(n+1)}$ of a (n+1)-th pulse to be applied to (n+1)-th qubit.

In block 710, the pulse function $g^{(n-1)}(t)$ of a (n−1)-th pulse to be applied to (n−1)-th qubit has not been determined. Thus, a linear combination $\vec{g}^{(n)} = \sum_{\beta=1}^{N_0-(n-1)} \Lambda_{(\beta)}^{(n)} \vec{g}^{[\beta]}$ of the pulse functions $\vec{g}^{[\beta]}$, determined in block 706 for the n-th iteration and similarly a linear combination $\vec{\Omega}^{(n-1)} = \sum_{\beta=1}^{N_0-(n-2)} \Lambda_{(\beta)}^{(n-1)} \vec{g}^{[\beta]}$ of the pulse functions $\vec{g}^{[\beta]}$, determined in block 706 in the previous iteration for (n−1)-th qubit are computed (i.e., the coefficients $\Lambda_{(\beta)}^{(n)}$ and $\Lambda_{(\beta)}^{(n-1)}$ are determined) such that the condition for non-zero) pair-wise entanglement interaction in the n-th and (n−1)-th qubits ($\sum_{k=1}^{N_A} \sum_{l=1}^{N_A} g_k^{(m)} D_{kl}^{(m,n)} g_l^{(n)} = \theta^{(m,n)}$) is satisfied and the norms of the resulting n-th and (n−1)-th pulses averaged over the gate duration $\tau$, $\sum_{k=1}^{N_A} |\bar{g}_k^{(n)}|^2$ and $\sum_{k=1}^{N_A} |\bar{g}_k^{(n-1)}|^2$ are minimized. The n-th and (n−1)-th pulses described above are configured to be power-optimal (i.e., the required laser power is minimized). The process returns to block 704 for determining the pulse function $g^{(n+1)}$ of a (n+1)-th pulse to be applied to (n+1)-th qubit.

In block 712, a linear combination $\vec{g}^{(n)} = \sum_{\beta=1}^{N_0-(n-1)} \Lambda_{(\beta)}^{(n)} \vec{g}^{[\beta]}$ of the pulse functions $\vec{g}^{[\beta]}$, determined in block 706 is computed (i.e., the coefficients $\Lambda_{(\beta)}^{(n)}$ are determined) such that the conditions for non-zero pair-wise entanglement interaction and decoupling in the n-th and m-th qubits (m=1, 2, . . . , n−1) ($\sum_{k=1}^{N_A} \sum_{l=1}^{N_A} g_k^{(m)} D_{kl}^{(m,n)} g_l^{(n)} = \theta^{(m,n)}$, if the n-th and m-th qubits are to be entangled, or 0 otherwise) and the norms of the resulting n-th pulse averaged over the gate duration $\tau$, $\sum_{k=1}^{N_A} |\bar{g}_k^{(n)}|^2$, is minimized. The n-th and (n−1)-th pulses described above are configured to be power-optimal (i.e., the required laser power is minimized). The process returns to block 704 for determining the pulse function $g^{(n+1)}$ of a (n+1)-th pulse to be applied to (n+1)-th qubit.

The process ends when pulses for all the $N_{EASE}$ participating qubits are constructed.

The application of the constructed pulses as described above to the participating qubits implements pair-wise entangling gate operations (XX gate operations) on pairs within the participating qubits among the series of universal gate {R, XX} operations into which a selected quantum algorithm is decomposed. All of the XX-gate operations (XX gates) in the series of universal gate {R, XX} operations are implemented by the method 700 described above, along with single-qubit operations (R gates), to run the selected quantum algorithm, which is defined and implemented by the classical computer. At the end of running the selected quantum algorithm, population of the qubit states (trapped ions) within the quantum register (the chain 102 of trapped ions) is determined (read-out) by measurements obtained by the imaging objective 104 and mapped onto the PMT 106, so that the results of the quantum computation(s) within the selected quantum algorithm can be determined and provided as input to the classical computer (e.g., digital computer). The results of the quantum computation(s) can then be processed by the classical computer to perform a desired activity or obtain solutions to problems that are typically not ascertainable, or ascertainable in a reasonable amount of time, by the classical computer alone. The problems that are known to be intractable or unascertainable by the conventional computers (i.e., classical computers) today and may be solved by use of the results obtained from the performed quantum computations may include, but are not limited to simulating internal chemical structures of complex molecules and materials, and factoring a large integer.

The EASE protocol described herein can determine pulses to perform simultaneous pair-wise entangling gate operations on multiple pairs of qubits without errors or approximations in an efficient manner. That is, overhead for determining the pulses, such as a number of time segments, only increases linearly with respect to the number of participating qubits. This is contrast to previously-proposed non-linear and approximate methods that require overhead that increases exponentially as the number of participating qubits increases. Furthermore, the pulses constructed by the EASE protocol are optimal when used for a single XX gate operation in that the required laser power to perform gate operations is minimum in the case the amplitude modulation is used to achieve the desired entanglement. Therefore, a quantum computer can be scaled up to a larger size at a faster execution speed, with given available resources, such as laser powers to implement the pulse or computational resources to determine pulses.

While the foregoing is directed to specific embodiments, other and further embodiments may be devised without departing from the basic scope thereof, and the scope thereof is determined by the claims that follow.

The invention claimed is:

1. A method of using an ion trap quantum computer, comprising:
   computing an amplitude value and a detuning frequency value of each of a plurality of laser pulses such that the plurality of laser pulses cause pair-wise entanglement interaction in a first plurality of pairs of trapped ions among a plurality of trapped ions in an ion trap quantum computer and do not cause pair-wise entanglement interaction in a second plurality of pairs of trapped ions among the plurality of trapped ions,
   wherein the plurality of trapped ions are aligned in a first direction and each of the trapped ions having two frequency-separated states defining a qubit.

2. The method according to claim 1, further comprising:
   applying the computed plurality of laser pulses to the plurality of trapped ions to perform simultaneous pair-wise entangling gate operations on the plurality of trapped ions.

3. The method according to claim 2, wherein the pair-wise entanglement interaction in the first plurality of pairs of trapped ions among the plurality of trapped ions has a value between zero and $\pi/2$.

4. The method according to claim 2, further comprising:
computing the amplitude value and the detuning frequency value of each of the plurality of laser pulses based on values of phase space trajectories of the plurality of trapped ions in a second direction that is perpendicular to the first direction that are to be created by the application of the computed plurality of laser pulses.

5. The method according to claim 4, wherein
the amplitude value and the detuning frequency value of each of the plurality of laser pulses are computed further based on power provided to the plurality of trapped ions by the plurality of laser pulses.

6. The method according to claim 1, wherein computing the amplitude value and the detuning frequency value of each of the plurality of laser pulses comprises dividing a gate duration value of the plurality of laser pulses into a plurality of time segments.

7. The method according to claim 1, further comprising:
executing, by a processor in a digital computer, a software program that is stored in non-volatile memory of the digital computer, wherein the executed software program requires at least one computation to be performed, and performing the at least one computation comprises:
selecting, by the processor in the digital computer, a quantum algorithm to be implemented on the plurality of trapped ions;
compiling the selected quantum algorithm into a series of universal logic gates;
translating the series of universal logic gates into a series of simultaneous pair-wise entangling gate operations to apply on the plurality of trapped ions;
measuring population of qubit states of the plurality of trapped ions; and
processing quantum information corresponding to the qubit states of the plurality of trapped ions by the processor of the digital computer based on the measured population of the qubit states; and
generating a solution to the selected quantum algorithm based on the processed results of the quantum computations.

8. A non-transitory computer-readable medium including computer program instructions, which when executed by a processor, cause the processor to:
compute an amplitude value and a detuning frequency value of each of a plurality of laser pulses such that the plurality of laser pulses cause pair-wise entanglement interaction in a first plurality of pairs of trapped ions among a plurality of trapped ions in an ion trap quantum computer and do not cause pair-wise entanglement interaction in a second plurality of pairs of trapped ions among the plurality of trapped ions,
wherein the plurality of trapped ions are aligned in a first direction and each of the trapped ions having two frequency-separated states defining a qubit.

9. The non-transitory computer-readable medium according to claim 8, wherein the computer program instructions further cause the processor to:
apply the computed plurality of laser pulses to the plurality of trapped ions to perform simultaneous pair-wise entangling gate operations on the plurality of trapped ions.

10. The non-transitory computer-readable medium according to claim 9, wherein the pair-wise entanglement interaction in the first plurality of pairs of trapped ions among the plurality of trapped ions has a value between zero and $\pi/2$.

11. The non-transitory computer-readable medium according to claim 9, wherein computing the plurality of laser pulses further comprises:
computing the amplitude value and the detuning frequency value of each of the plurality of laser pulses based on values of phase space trajectories of the plurality of trapped ions in a second direction that is perpendicular to the first direction that are to be created by the application of the computed plurality of laser pulses.

12. The non-transitory computer-readable medium according to claim 11, wherein
the amplitude value and the detuning frequency value of each of the plurality of laser pulses are computed further based on power provided to the plurality of trapped ions by the plurality of laser pulses.

13. The non-transitory computer-readable medium according to claim 8, wherein computing the amplitude value and the detuning frequency value of each of the plurality of laser pulses comprises dividing a gate duration value of the plurality of laser pulses into a plurality of time segments.

14. A quantum computing system, comprising:
a plurality of trapped ions that are aligned in a first direction, each of the trapped ions having two hyperfine states defining a qubit; and
a controller comprising non-volatile memory having a number of instructions stored therein which, when executed by a processor, causes the quantum computing system to perform operations comprising:
computing an amplitude value and a detuning frequency value of each of a plurality of laser pulses based on values of pair-wise entanglement interaction in the plurality of trapped ions that is to be caused by the plurality of laser pulses such that the plurality of laser pulses cause pair-wise entanglement interaction in a first plurality of pairs of trapped ions among the plurality of trapped ions and do not cause pair-wise entanglement interaction in a second plurality of pairs of trapped ions among the plurality of trapped ions.

15. The quantum computing system of claim 14, wherein the operations further comprises:
applying the computed plurality of laser pulses to the plurality of trapped ions to perform simultaneous pair-wise entangling gate operations on the plurality of trapped ions.

16. The quantum computing system according to claim 14, wherein each of the trapped ions is $^{171}Yb^+$ having $^2S_{1/2}$ hyperfine states.

17. The quantum computing system according to claim 14, wherein the pair-wise entanglement interaction in the first plurality of pairs of trapped ions among the plurality of trapped ions has a value between zero and $\pi/2$.

18. The quantum computing system according to claim 14, wherein computing the plurality of laser pulses further comprises:
computing the amplitude value and the detuning frequency value of each of the plurality of laser pulses based on values of phase space trajectories of the plurality of trapped ions in a second direction that is perpendicular to the first direction that are to be caused by the plurality of laser pulses.

19. The quantum computing system according to claim 18, wherein
the amplitude value and the detuning frequency value of each of the plurality of laser pulses are computed further based on power provided to the plurality of trapped ions by the plurality of laser pulses.

20. The quantum computing system according to claim 14, wherein computing the amplitude value and the detuning frequency value of each of the plurality of laser pulses comprises dividing a gate duration value of the plurality of laser pulses into a plurality of time segments.

* * * * *